United States Patent
Robertson et al.

(10) Patent No.: US 10,002,393 B1
(45) Date of Patent: *Jun. 19, 2018

(54) SYSTEMS AND METHODS FOR SUPPORTING A TESTING ENVIRONMENT FOR A WEBSITE

(71) Applicant: STATE FARM MUTUAL AUTOMOBILE INSURANCE COMPANY, Bloomington, IL (US)

(72) Inventors: Julie Robertson, Normal, IL (US); Ginger Shepard, Gilbert, AZ (US); Derek Schneider, Bloomington, IL (US); Ezra Schwartz, Bloomington, IL (US)

(73) Assignee: STATE FARM MUTUAL AUTOMOBILE INSURANCE COMPANY, Bloomington, IL (US)

( * ) Notice: Subject to any disclaimer, the term of this patent is extended or adjusted under 35 U.S.C. 154(b) by 143 days.

This patent is subject to a terminal disclaimer.

(21) Appl. No.: 14/876,492

(22) Filed: Oct. 6, 2015

Related U.S. Application Data

(63) Continuation of application No. 14/643,336, filed on Mar. 10, 2015, now Pat. No. 9,223,682, which is a continuation of application No. 14/256,544, filed on Apr. 18, 2014, now Pat. No. 9,037,919.

(51) Int. Cl.
- G06F 11/00 (2006.01)
- G06Q 40/08 (2012.01)
- G06Q 30/06 (2012.01)
- G06F 3/0482 (2013.01)
- G06F 3/0484 (2013.01)

(52) U.S. Cl.
CPC ........... *G06Q 40/08* (2013.01); *G06F 3/0482* (2013.01); *G06F 3/04842* (2013.01); *G06Q 30/0641* (2013.01)

(58) Field of Classification Search
USPC ......................................................... 714/46
See application file for complete search history.

(56) References Cited

U.S. PATENT DOCUMENTS

| | | | |
|---|---|---|---|
| 7,028,223 B1 * | 4/2006 | Kolawa | G06F 11/3688 714/37 |
| 7,295,953 B2 * | 11/2007 | Cox | G06F 11/3414 702/119 |
| 2010/0174952 A1 * | 7/2010 | Anastas | H04L 12/6418 714/57 |

* cited by examiner

*Primary Examiner* — Sarai E Butler
(74) *Attorney, Agent, or Firm* — Marshall, Gerstein & Borun LLP; Randall G. Rueth

(57) ABSTRACT

Methods and systems for supporting a testing environment associated with a website for purchasing insurance products. The testing environment supports a plurality of test scenarios for testing the website. A user of the testing environment can select one of the test scenarios and the methods and systems render the website in a context of the selected test scenario. The methods and systems enable the user to navigate throughout the selected test scenario to aid in testing website functionality. According to embodiments, the testing environment includes a progress indicator that displays a user's progress through the selected test scenario. Further, the user can select a scenario flow chart that indicates various data parameters associated with the selected test scenario.

20 Claims, 11 Drawing Sheets

Holistic Prototype

Home | Inventory of Prototypes | About

Scenario Library

By LOB: Any ▼    By User: Any ▼  OR ▼    By Scenario ID/Name: Select ▼

| Scenario ID/Name | Scenario in Brief | User Type | Prototypes Used | Standards/KPIs | Channel/s |
|---|---|---|---|---|---|
| E2E-0.9 CASE | Potential customer going through an auto quote. More detail... | Potential Customer | • CASE/DC5<br>• Quote/DC2-Auto | TBD | Digital<br>Hybrid |
| E2E-1<br>Auto+Homeowners | Scenario in Brief will appear here and should help stakeholders and other select the appropriate scenario. More detail... | • Customer<br>• SA | • | TBD | Digital<br>Hybrid<br>More |
| E2E-2 Life | Scenario in Brief will appear here and should help stakeholders and other select the appropriate scenario. More detail... | • Customer<br>• SA | • Proto 1/DC...<br>• Proto 1/DC...<br>• Proto 1/DC...<br>Show all... | TBD | Digital<br>Hybrid<br>More |
| E2E-3 Claim | Scenario in Brief will appear here and should help stakeholders and other select the appropriate scenario. More detail... | • Customer<br>• SA | • Proto 1/DC...<br>• Proto 1/DC...<br>• Proto 1/DC...<br>Show all... | TBD | Digital<br>Hybrid<br>More |
| E2E-4 TBD | Scenario in Brief will appear here and should help stakeholders and other select the appropriate scenario. More detail... | • Customer<br>• SA | • Proto 1/DC...<br>• Proto 1/DC...<br>• Proto 1/DC... | TBD | Digital<br>Hybrid<br>More |

Insurance Finances Claims Customer Care Bundle (0) En Español Search Login

SELECT PRODUCTS

Build Your Bundle

To get started, choose products below.

☐ Product to Bundle

Create your bundle by adding and removing products. Once you've assembled the right combination, we'll get started by generating your first quote.

Auto
Personal service and discounts up to 40%.

$ Save up 15% alongside Renters or Condo — 755
[Add to bundle]

Renters
Save big, protect your property.

$ Save up 15% alongside Auto — 756
[Add to bundle]

Condo
Create the policy that's right for you.

$ Save up 15% alongside Auto — 757
[Add to bundle]

Choose an Agent
Choose a State Farm Agent to be your contact person for this quote. They're ready with trusted, professional insurance advice.
[Choose an Agent]

Need Assistance?
A representative is ready to answer your questions.
[Go]

SYSTEMS AND METHODS FOR SUPPORTING A TESTING ENVIRONMENT FOR A WEBSITE

CROSS-REFERENCE TO RELATED APPLICATIONS

The present application is a continuation of U.S. patent application Ser. No. 14/643,336, filed Mar. 10, 2015, which is a continuation of U.S. patent application Ser. No. 14/256,544, filed on Apr. 18, 2014, now U.S. Pat. No. 9,037,919. The disclosures of these applications are hereby fully incorporated by reference in their entirety.

FIELD OF THE DISCLOSURE

This disclosure generally relates to software testing, and in particular, to an improved testing environment for a website associated with insurance products.

BACKGROUND

Insurance companies or insurance providers offer various insurance products or services to customers. For example, insurance companies can offer one or more of car insurance, homeowners insurance, life insurance, renters insurance, fire insurance, health insurance, and others. It can be the case for insurance companies to join insurance products or services together to sell as a single combined unit or as related units, commonly known as "bundling." Bundling allows a customer to obtain multiple products or services from a single provider at a lower cost and/or with greater convenience than if the customer obtained the products individually. For example, when a homeowners' insurance policy and an automobile insurance policy are bundled, the amount of the total premium of the bundled product is less than the sum of the individual premiums of the unbundled policies. In another example, an insurance provider offers a discount on premiums of an auto insurance policy if a customer has a current life insurance policy. In some cases, the insurance company combines the premium payments across multiple insurance policies into one payment for customer convenience.

Customers have various options and channels for purchasing insurance products or services. For example, customers may purchase insurance products or services with an agent during an in-person appointment or via a telephone call. However, there are limitations associated with enabling customers to purchase individual or bundled insurance products or services online or otherwise via a website or application.

SUMMARY

In an embodiment, a computer implemented method of supporting a testing environment associated with a website for purchasing insurance products is provided. The method comprises presenting, in a user interface, identifications of a plurality of test scenarios for testing the website and receiving, via the user interface, a selection of one of the plurality of test scenarios, the selected test scenario associated with a purchase of at least one of the insurance products. The method further comprises rendering, in the user interface by a processor, the website in a context of the selected test scenario, receiving, via the user interface, at least one navigation selection for the selected test scenario, and updating the website rendering based on the at least one navigation selection, wherein the website rendering is updated with a navigation progress indicator associated with the purchase of the at least one insurance product.

In another embodiment, a system for supporting a testing environment associated with a website for purchasing insurance products is provided. The system comprises a user interface adapted to receive user input, a display device adapted to display content and implement the user interface, a memory adapted to store data related to a plurality of test scenarios for testing the website, and a processor adapted to interface with the user interface, the display device, and the memory. The processor is configured to execute computer executable instructions stored in the memory to cause the processor to cause the display device to present identifications of the plurality of test scenarios, and receive, via the user interface, a selection of one of the plurality of test scenarios, the selected test scenario associated with a purchase of at least one of the insurance products. The computer executable instructions further cause the processor to cause the display device to render the website in a context of the selected test scenario, receive, via the user interface, at least one navigation selection for the selected test scenario, and cause the display device to update the website rendering based on the at least one navigation selection, wherein the website rendering is updated with a navigation progress indicator associated with the purchase of the at least one insurance product.

In another embodiment, a computer readable storage medium comprising non-transitory computer readable instructions stored thereon for supporting a testing environment associated with a website for purchasing insurance products is provided. When executed on a processor, the instructions cause the processor to present, in a user interface, identifications of a plurality of test scenarios for testing the website, and receive, via the user interface, a selection of one of the plurality of test scenarios, the selected test scenario associated with a purchase of at least one of the insurance products. The instructions further cause the processor to render, in the user interface, the website in a context of the selected test scenario, receive, via the user interface, at least one navigation selection for the selected test scenario, and update the website rendering based on the at least one navigation selection, wherein the website rendering is updated with a navigation progress indicator associated with the purchase of the at least one insurance product.

BRIEF DESCRIPTION OF THE DRAWINGS

FIGS. 3-9 depict example interfaces associated with a testing environment in accordance with some embodiments.

DETAILED DESCRIPTION

Figure 1:
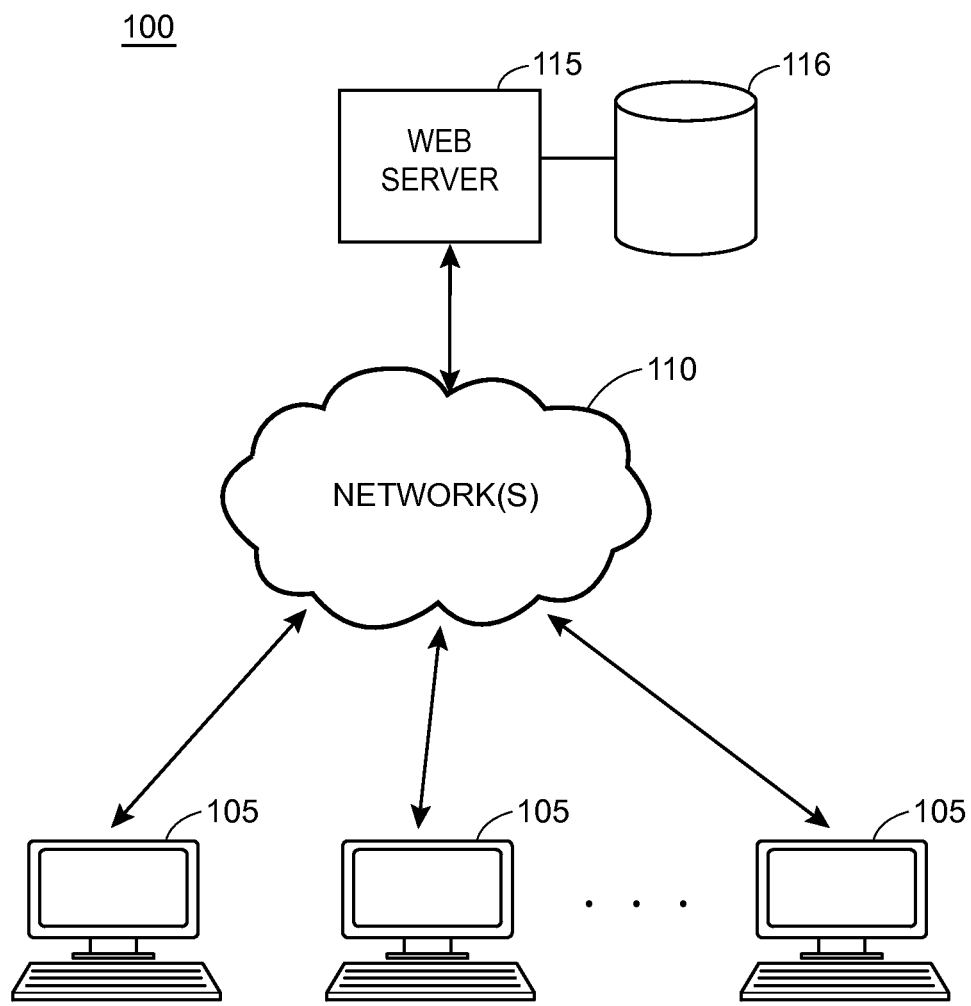
FIG. 1 depicts an example configuration for supporting a testing environment to test a website in accordance with some embodiments.

The novel methods and systems disclosed herein generally relate to a testing environment associated with a website that enables customers to purchase various insurance products or services. The testing environment enables software developers or other users to execute various test scenarios corresponding to a plurality of simulated walkthroughs supported by the website. In some embodiments, the plurality of simulated walkthroughs correspond to a customer purchasing one or more of the insurance products or services. For example, a software developer may navigate through one of the test scenarios to simulate a customer purchasing auto insurance and renters insurance. In some embodiments, the testing environment enables developers to ascertain various inputs, parameters, progress indications, or other indicators associated with testing, debugging, or insuring proper functionality of the website. Further, in some embodiments, the testing environment enables developers to simulate the bundling of multiple insurance products or services, whereby the multiple insurance products or services may be based on identifying information of an example customer.

Providing the testing environment may result in troubleshooting improvements and efficiency benefits to developers. For example, the various test scenarios enable developers to easily and effectively assess problems or issues that consumers may encounter when purchasing insurance products or services via a website. For further example, the progress indicators and flow chart displays enable developers to ensure that navigation through the test scenarios as well as data and parameters associated with purchasing insurance products or services are accurate. Further, for example, the test scenarios enable proper operation associated with consumers purchasing bundled insurance products or services. Embodiments as discussed herein may lead to benefits to providers of the insurance policies. For example, by offering insurance products or services online, providers may attract a wider customer base, may increase sales, and/or may increase profits.

Enabling customers to purchase one or more insurance products or services online may result in financial and/or convenience benefits to customers. For example, a customer of a bundled insurance policy may receive a discount on the insurance premium. Alternatively or additionally, the customer is able to easily and effectively purchase one or more insurance products or services via an online interface such as a website. It should be appreciated that other benefits may be possible.

It should also be understood that, unless a term is expressly defined in this patent using the sentence "As used herein, the term '_____' is hereby defined to mean . . ." or a similar sentence, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this disclosure is referred to in this disclosure in a manner consistent with a single meaning, that is done for sake of clarity only so as to not confuse the reader, and it is not intended that such claim term be limited, by implication or otherwise, to that single meaning. Finally, unless a claim element is defined by reciting the word "means" and a function without the recital of any structure, it is not intended that the scope of any claim element be interpreted based on the application of 35 U.S.C. § 112, sixth paragraph.

Accordingly, the term "insurance policy," as used herein, generally refers to a contract between an insurer and an insured. In exchange for payments from the insured, the insurer pays for damages to the insured which are caused by covered perils, acts or events as specified by the language of the insurance policy. The payments from the insured are generally referred to as "premiums," and typically are paid on behalf of the insured over time at periodic intervals. The amount of the damages payment is generally referred to as a "coverage amount" or a "face amount" of the insurance policy. An insurance policy may remain (or have a status or state of) "in-force" while premium payments are made during the term or length of coverage of the policy as indicated in the policy. An insurance policy may "lapse" (or have a status or state of "lapsed"), for example, when premium payments are not being paid, when a cash value of a policy falls below an amount specified in the policy (e.g., for variable life or universal life insurance policies), or if the insured or the insurer cancels the policy.

The terms "insurer," "insuring party," and "insurance provider" are used interchangeably herein to generally refer to a party or entity (e.g., a business or other organizational entity) that provides insurance products, e.g., by offering and issuing insurance policies. Typically, but not necessarily, an insurance provider may be an insurance company.

An insurance provider may provide one or more different types of insurance, insurance products, insurance services, or insurance policies (collectively referred to herein as "insurance products"). Types of insurance products may include, for example, auto insurance; homeowners insurance; condominium owner insurance; renter's insurance; life insurance (e.g., whole-life, universal, variable, term, etc.); health insurance; disability insurance; long-term care insurance; annuities; business insurance (e.g., property, liability, commercial auto, workers compensation, professional and specialty liability, inland marine and mobile property, surety and fidelity bonds, etc.); boat insurance; insurance for catastrophic events such as flood, fire, volcano damage and the like; motorcycle insurance; farm and ranch insurance; personal article insurance; personal liability insurance; personal umbrella insurance; community organization insurance (e.g., for associations, religious organizations, cooperatives, etc.); and other types of insurance products.

The terms "insured," "insured party," and "policyholder" are used interchangeably herein to refer to a person, party, or entity (e.g., a business or other organizational entity) that is covered by the insurance policy, e.g., whose insured article or entity (e.g., property, life, health, auto, home, business, etc.) is covered by the policy. A "guarantor," as used herein, generally refers to a person, party or entity that is responsible for payment of the insurance premiums. The guarantor may or may not be the same party as the insured, such as in situations when a guarantor has power of attorney for the insured. An "annuitant," as referred to herein, generally refers to a person, party or entity that is entitled to receive benefits from an annuity insurance product offered by the insuring party. The annuitant may or may not be the same party as the guarantor.

Typically, a person or customer (or an agent of the person or customer) of an insurance provider fills out an application for an insurance policy. The application may undergo underwriting to assess the eligibility of the party and/or desired insured article or entity to be covered by the insurance policy, and, in some cases, to determine any specific terms or conditions that are to be associated with the insurance policy, e.g., amount of the premium, riders or exclusions, waivers, and the like. Upon approval by underwriting, acceptance of the applicant to the terms or conditions, and payment of the initial premium, insurance policy may be in-force, e.g., the policyholder is enrolled.

FIG. 1 depicts an example environment 100 associated with supporting a testing environment for a website.

Although FIG. 1 depicts certain entities and components, it should be appreciated that additional or alternate entities and components are envisioned.

The environment 100 includes a web server 115 and a plurality of client devices 105. According to embodiments, the web server 115 can be a combination of hardware and software components configured to host a website and one or more testing environments associated with the website. The testing environments can be dedicated applications that support testing the operation of the website. The web server 115 can have an associated database 116 for storage of data associated with the website and the one or more testing environments. Although not shown in FIG. 1, the web server 115 can further include any processing logic or components capable of facilitating the functionalities as discussed herein. Further, although FIG. 1 depicts three client devices 105, it should be appreciated that environments with fewer or more client devices are envisioned. Each of the client devices 105 may be, for example, a desktop computer, a notebook computer, a tablet device, a handheld wireless device such as a mobile phone, a Personal Digital Assistant (PDA), a smartphone, or any other electronic apparatus.

The plurality of client devices 105 can connect to and communicate with the web server 115 via a network 110 such as, for example, a wide area network (WAN), a local area network (LAN), a personal area network (PAN), or other networks. The network 110 can facilitate any type of data communication via any wired or wireless standard or technology (e.g., GSM, CDMA, TDMA, WCDMA, LTE, EDGE, OFDM, GPRS, EV-DO, UWB, IEEE 802 including Ethernet, WiMAX, WiFi, Bluetooth, and others). Users can use the plurality of client devices 105 to execute applications associated with the testing environment of the web server 115 to test operation of the website. Further, users can use the plurality of client devices 105 to access the website of the web server 115 to, for example, purchase insurance products.

According to embodiments, the testing environment of the web server 115 supports a plurality of test scenarios that can correspond to simulated walkthroughs associated with a customer or insured party retrieving quotes for and/or purchasing one or more insurance products from a guarantor. For example, one test scenario can correspond to a simulated walkthrough of a customer purchasing auto insurance. For further example, a second test scenario can correspond to a simulated walkthrough of a customer purchasing homeowners insurance. Further, for example, a third test scenario can correspond to a simulated walkthrough of a customer purchasing a bundled package of renters insurance and a personal articles policy. It should be appreciated that other test scenarios are envisioned. The testing environment can be configured to cause the client device(s) 105 to display a "home screen" with indications of the supported test scenarios, thereby enabling a user of the client device(s) 105 to select one or more of the test scenarios. In some embodiments, the testing environment supports operation of one test scenario or multiple test scenarios (such as via multiple windows) at a time.

According to embodiments, a user of one of the client devices 105 (e.g., a software developer) may navigate throughout a selected test scenario via one or more selections. For example, the selections can be selections of various insurance products or other navigation selections (e.g., "Next," "Back," "OK," "Cancel," etc.). Further, in embodiments, the environment 100 can support the display of various flowcharts and progress indicators associated with the progress through a test scenario as well as any parameters indicative of data fields or other metrics.

Figure 2:
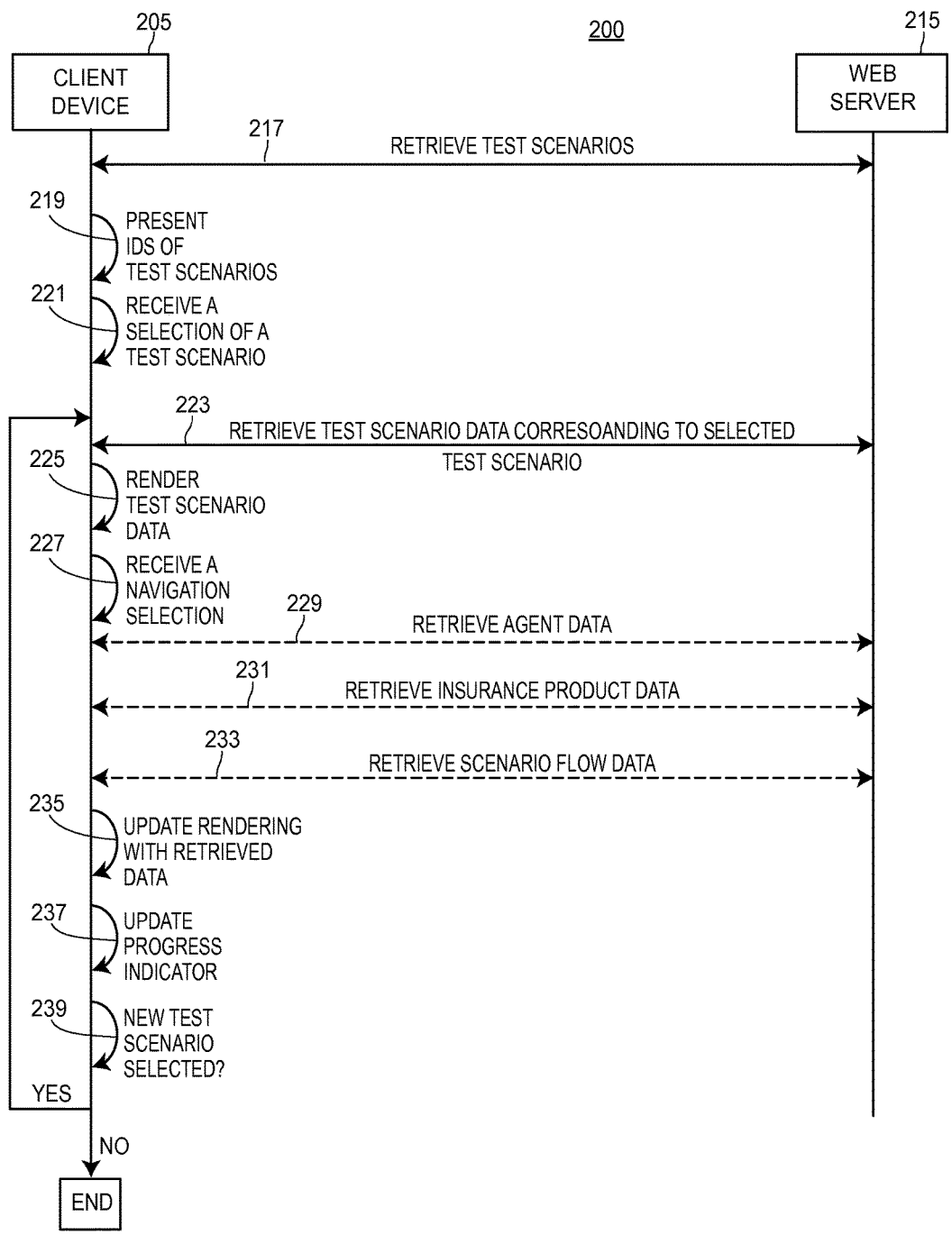
FIG. 2 depicts an example diagram associated with a testing environment in accordance with some embodiments.

FIG. 2 depicts an example diagram 200 associated with a user of a client device 205 utilizing a testing environment of a web server 215. Although FIG. 2 depicts only one client device 205, it should be appreciated that the functionalities of the diagram 200 can be implemented with multiple client devices. The testing environment utilization can begin with the client device 205 retrieving 217 test scenarios from the web server 215. In embodiments, a user (e.g., a software developer) of the client device 205 may request access to the testing environment of the web server 215, after which the web server 215 enables the client device 205 to initiate an application or process to access the testing environment. In some embodiments, the client device 205 can locally execute a dedicated application configured to communicate data to and from the web server 215.

The client device 205 can present 219 identifications of the test scenarios. In embodiments, the identifications can be links selectable by the user to initiate the corresponding test scenario. The client device 205 can receive 221 a selection of a test scenario. For example, the user may want to test operation of a test scenario corresponding to a customer purchasing bundled auto insurance and life insurance. The client device 205 can retrieve 223 test scenario data corresponding to the selected test scenario. Further, the client device 205 can render 225 the test scenario data (e.g., via a display device of the client device 205). According to embodiments, the client device 205 can render the test scenario data in a context of a user purchasing the one or more insurance products associated with the test scenario. In other words, the user of the client device 205 (e.g., a software developer) may view interfaces of the test scenario that are the same as or similar to interfaces that a customer would see when accessing the website to purchase the one or more associated insurance products.

The client device 205 can receive 227 a navigation selection associated with the test scenario. In some embodiments, the navigation selection may correspond to the user selecting to transition from a first interface screen to a second interface screen. In other embodiments, the navigation selection may correspond to a selection of an insurance product that the user wishes to purchase or for which to receive a quote. In an optional embodiment, the user may input (or the client device 205 may determine) identification data associated with the user. For example, the user may input his or her ZIP code or other location-based identification. Referring to FIG. 2, the client device 205 can optionally retrieve 229 agent data associated with the identification data. According to embodiments, the agent data may identify one or more insurance agents that are identified based on the identification data. For example, if the user inputs a ZIP code, the agent data may identify one or more insurance agents that have an office within a certain radius of a location corresponding to the ZIP code.

In other optional embodiment, for example if the navigation selection corresponds to an insurance product selection, the client device 205 can retrieve 231 insurance product data from the web server 215. For example, the insurance product data may include quote data, coverage information, term information, and/or other information associated with the insurance product. In an additional optional embodiment, the navigation selection may correspond to the user selecting a scenario flow diagram that tracks the user's progress through the test scenario as well as data parameters associated with the selected test scenario. Referring to FIG. 2, the client device 205 can optionally retrieve 233 scenario flow data.

The client device 205 can update 235 the test scenario rendering with the retrieved data. In embodiments, the client device 205 may display a new interface associated with the test scenario, and/or any agent data, insurance product data, or scenario flow data. In other embodiments, for example, if the user selects a first insurance product, the client device 205 may enable the user to select a second insurance product to bundle with the first insurance product. Further, the client device 205 can update 237 a navigation progress indicator of the test scenario. According to embodiments, the progress indicator can indicate the user's progress through the various points or stages of the test scenario. For example, if the user selects to purchase one or more insurance products, the progress indicator can progress from "Product Selection" to "Checkout." It should be appreciated that various stages for the progress indicator are envisioned.

The client device 205 can determine 239 if a new test scenario has been selected. In some embodiments, the user may select to exit the current test scenario or the testing environment may exit the current test scenario automatically, for example, after completion of the current test scenario. If a new test scenario has been selected ("YES"), processing can return to 223 or to other functionality. If a new test scenario has not been selected ("NO"), processing can end, repeat, or return to any previous functionality.

FIGS. 3-9 depict example interfaces associated with a testing environment in accordance with some embodiments. According to embodiments, a client device (such as the client device 105) can display the example interfaces. FIG. 3 depicts an example interface 300 associated with the testing environment. In particular, the example interface 300 depicts a "Scenario Library" including identifications 340, 341, 342, 343, 344 of example test scenarios. For example, 340 identifies a test scenario for a user to navigate through purchasing an auto insurance and 341 identifies a test scenario for a user to navigate through purchasing auto insurance and homeowners insurance. According to embodiments, the identifications 340, 341, 342, 343, 344 include links whereby when the client device detects a selection by a user of one of the identifications 340, 341, 342, 343, 344, the client device may initiate the corresponding test scenario. As shown in FIG. 3, the example interface 300 can also include other data corresponding to the test scenarios, such as a description of the test scenarios, users who would usually access the website as intended by the test scenarios, and/or various prototype(s), standard(s), and channel(s) that are used in the test scenarios.

Figure 4:
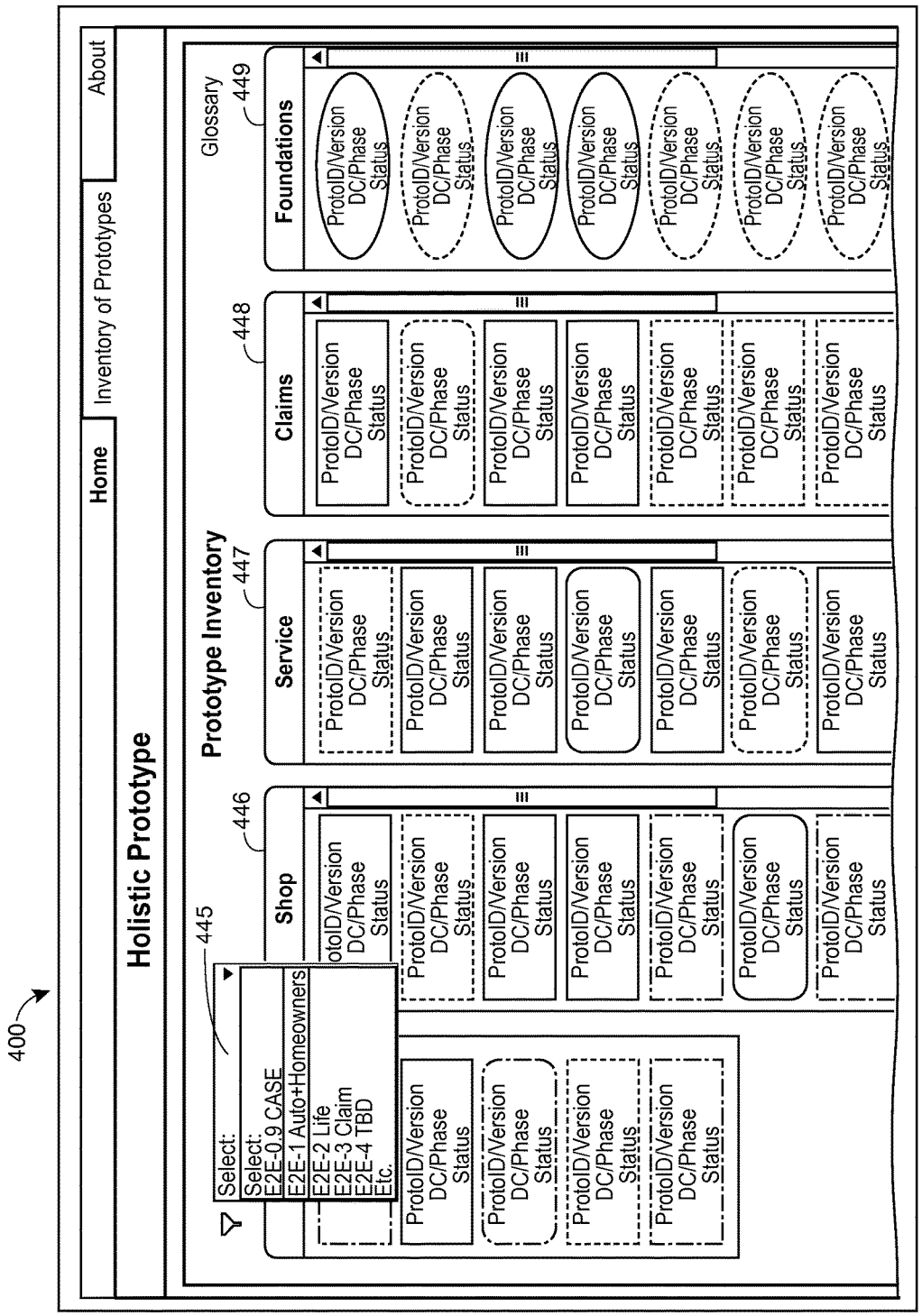

FIG. 4 depicts an example interface 400 associated with a testing environment. In particular, the example interface 400 enables users to assemble various project-level prototypes for a selected test scenario. According to embodiments, the project-level prototypes correspond to various functionalities that can be included in a selected test scenario. As shown in FIG. 4, a user can use a drop-down menu 445 to select a test scenario (such as one of the example test scenarios as discussed with respect to FIG. 3). Further, the example interface 400 includes various menus 446, 447, 448, 449 corresponding to certain stages of a given test scenario. As shown in FIG. 4, the various menus 446, 447, 448, 449 respectively correspond to "Shop," "Service," "Claims," and "Foundations" stages.

Figure 5:
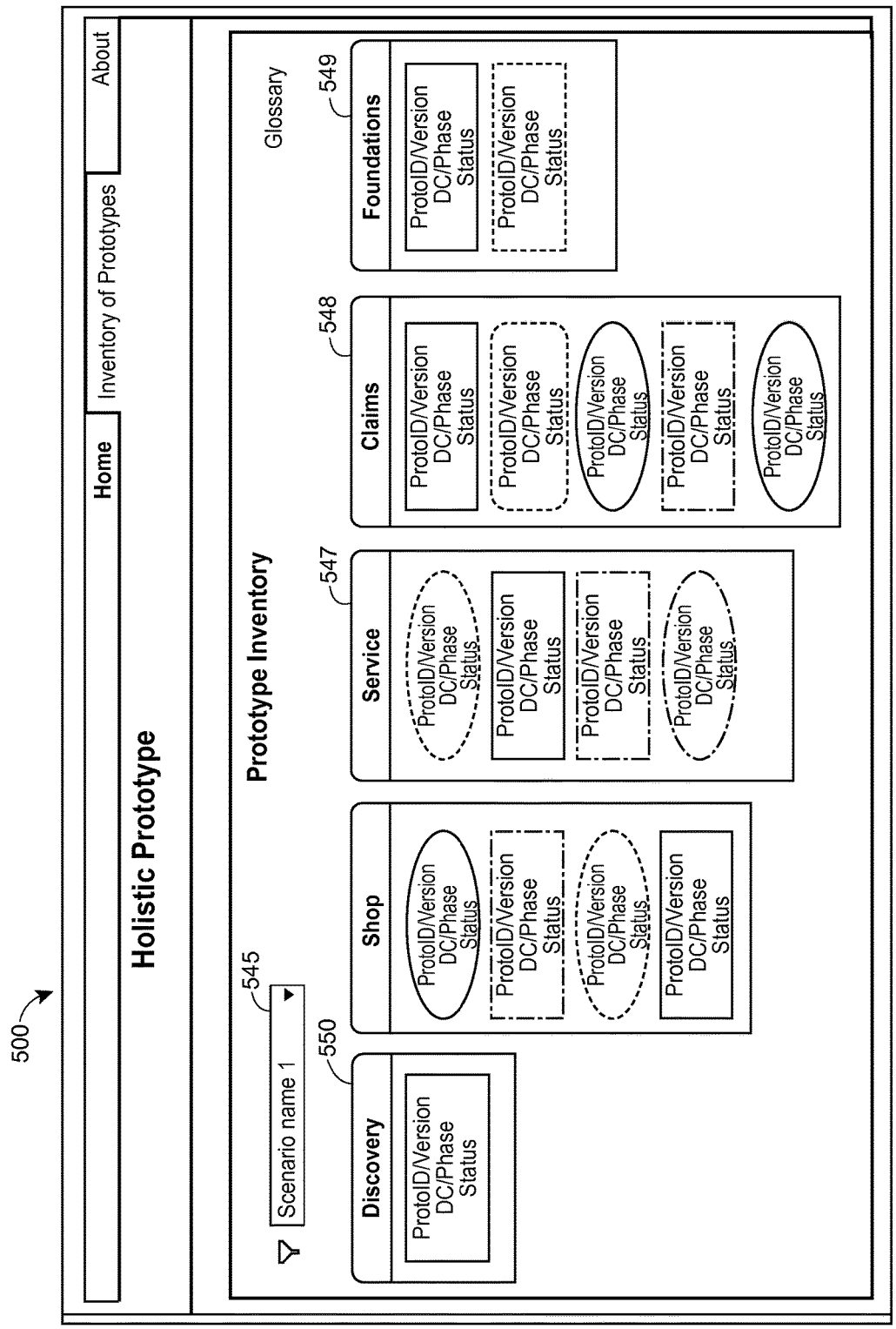

According to embodiments, a user is able to select one or more project-level prototypes from each of the menus 446, 447, 448, 449 to create a custom end-to-end walkthrough for a selected test scenario. FIG. 5 depicts an example interface 500 including project-level prototypes for an example scenario 545 "Scenario name 1." According to embodiments as shown in FIG. 5, a user has selected various project-level prototypes for the example scenario 545 from menus 546, 547, 548, 549, 550. For example, the user has selected one project-level prototype from the "Discovery" menu 550, four project-level prototypes from the "Shop" menu 546, and so on. The selected project-level prototypes can define the end-to-end functionality and handling of various selections for the example scenario 545.

Figure 6:
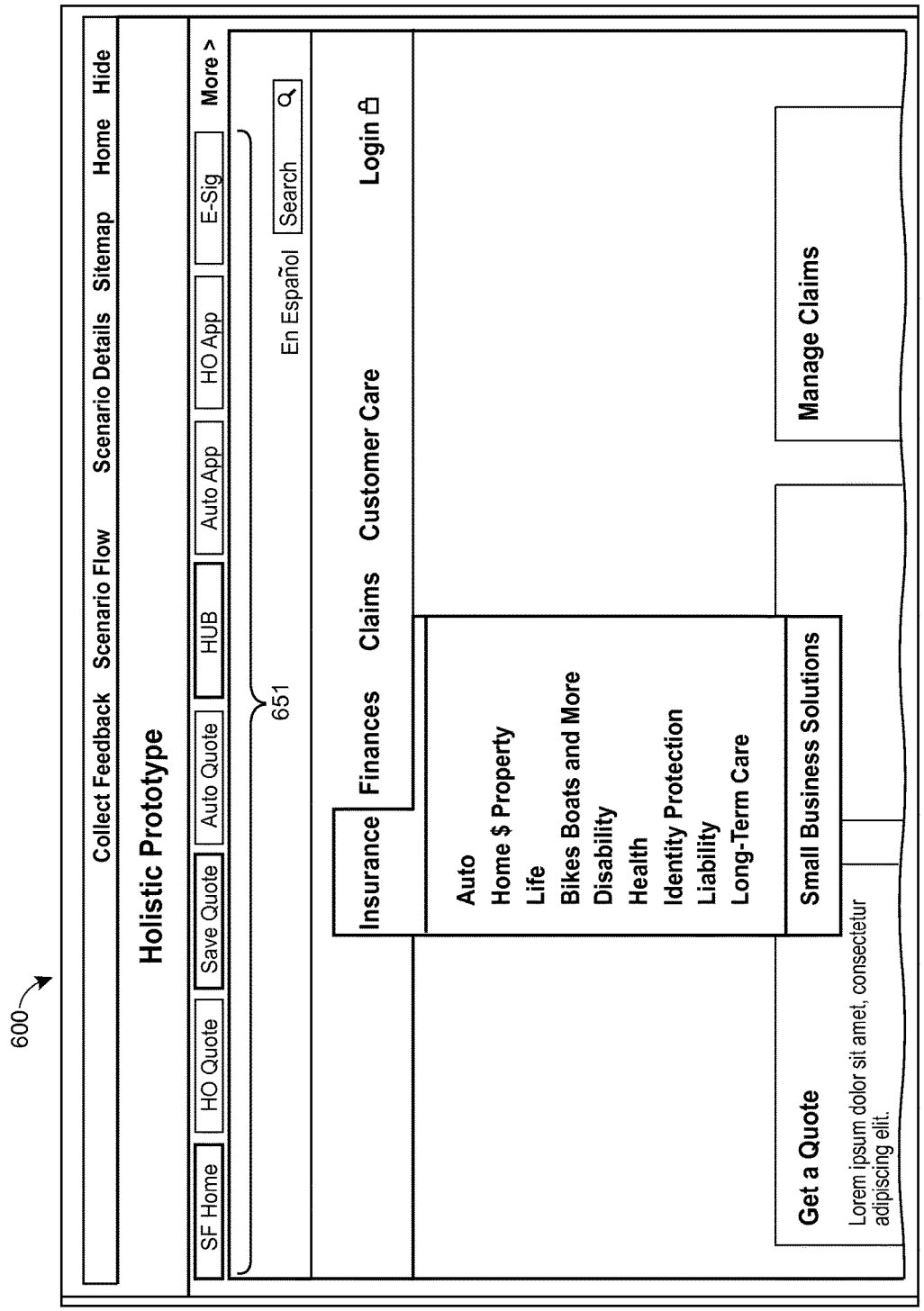

FIG. 6 depicts an example interface 600 associated with a testing environment. In particular, the example interface 600 depicts a website in a context of a selected test scenario (such as one of the test scenarios as depicted in FIG. 3), thereby enabling a user to test the selected test scenario for proper navigation, functionality, and the like. As shown in FIG. 6, a user can make various selections within the interface (as shown: the user is highlighting the "Insurance" menu). The example interface 600 can also include various selections 651 corresponding to developer tools associated with the selected test scenario. In particular, the various selections 651 enable the user to navigate throughout other interfaces associated with the testing environment.

FIG. 7 depicts an example interface 700 associated with "normal" operation of a website. In other words, the example interface 700 depicts the website as a user (such as a customer) would view when for example accessing the website via an Internet connection. As shown in FIG. 7, the example interface 700 can enable the user to build a bundle of multiple insurance products. For example, the user can select to add auto insurance 755, renters insurance 756, and/or condo insurance 757.

Figure 8:
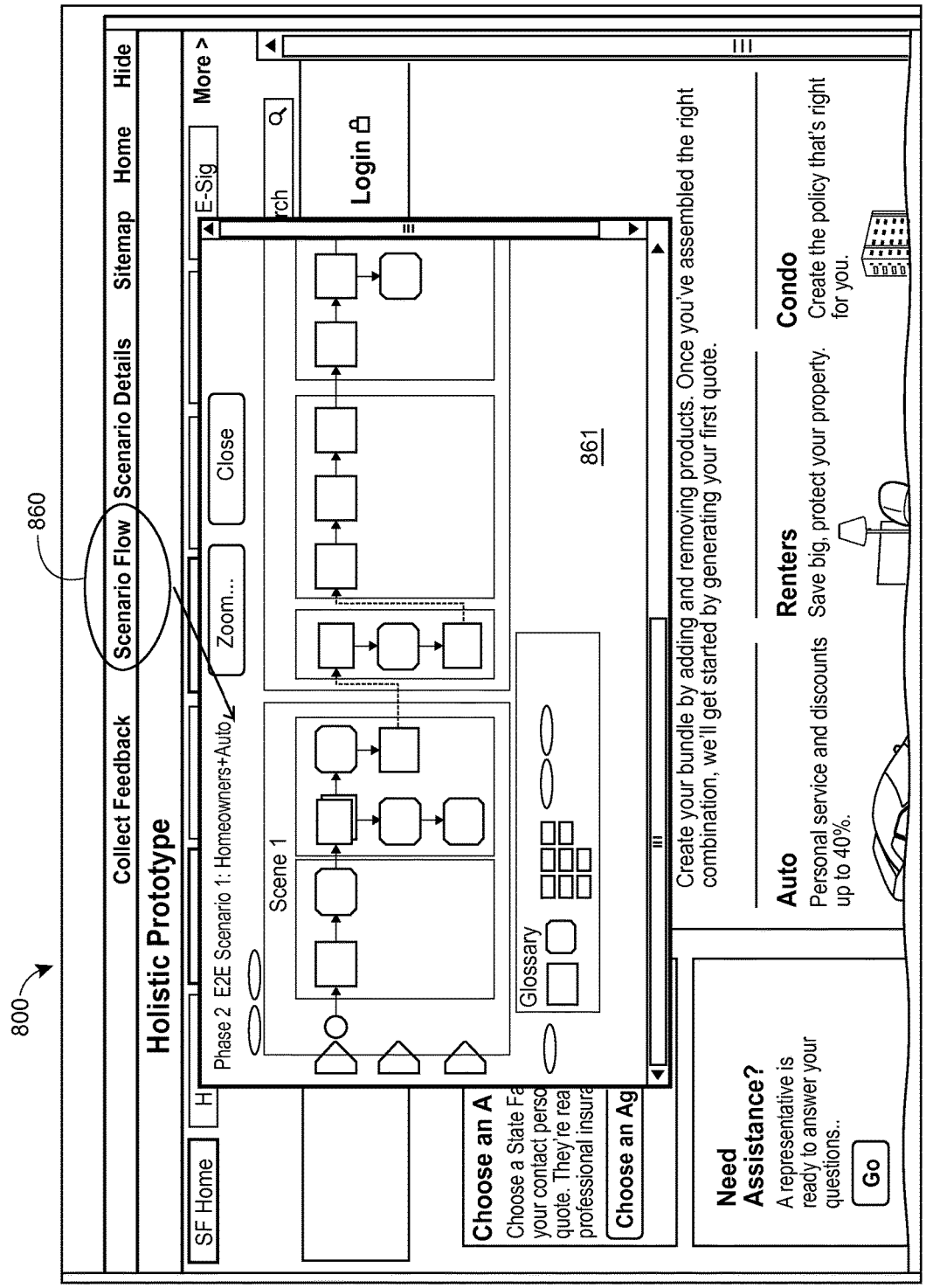

FIG. 8 depicts an example interface 800 including similar functionality as that of the example interface 700, but in a context of a test scenario view. In particular, a user (such as a developer) may have selected a test scenario corresponding to bundling multiple insurance products, and an associated client device can display the example interface 800 to enable the user to test the bundling functionality. As shown in FIG. 8, the example interface 800 includes a scenario flow selection 860 that, when selected, causes the example interface 800 to display a scenario flow window 861. According to embodiments, the scenario flow window 861 includes data associated with a navigation through the corresponding test scenario, such as previous selections, possible or potential selections for various interfaces, any project-level prototypes associated with the test scenario, values for data fields, a glossary of terms and acronyms, graphical flow charts indicating previous or potential interfaces or navigation selections, and/or other data. In operation, the scenario flow window 861 enables a user (e.g., a developer) to easily and effectively gauge proper operation or potential issues for the selected test scenario.

Figure 9:
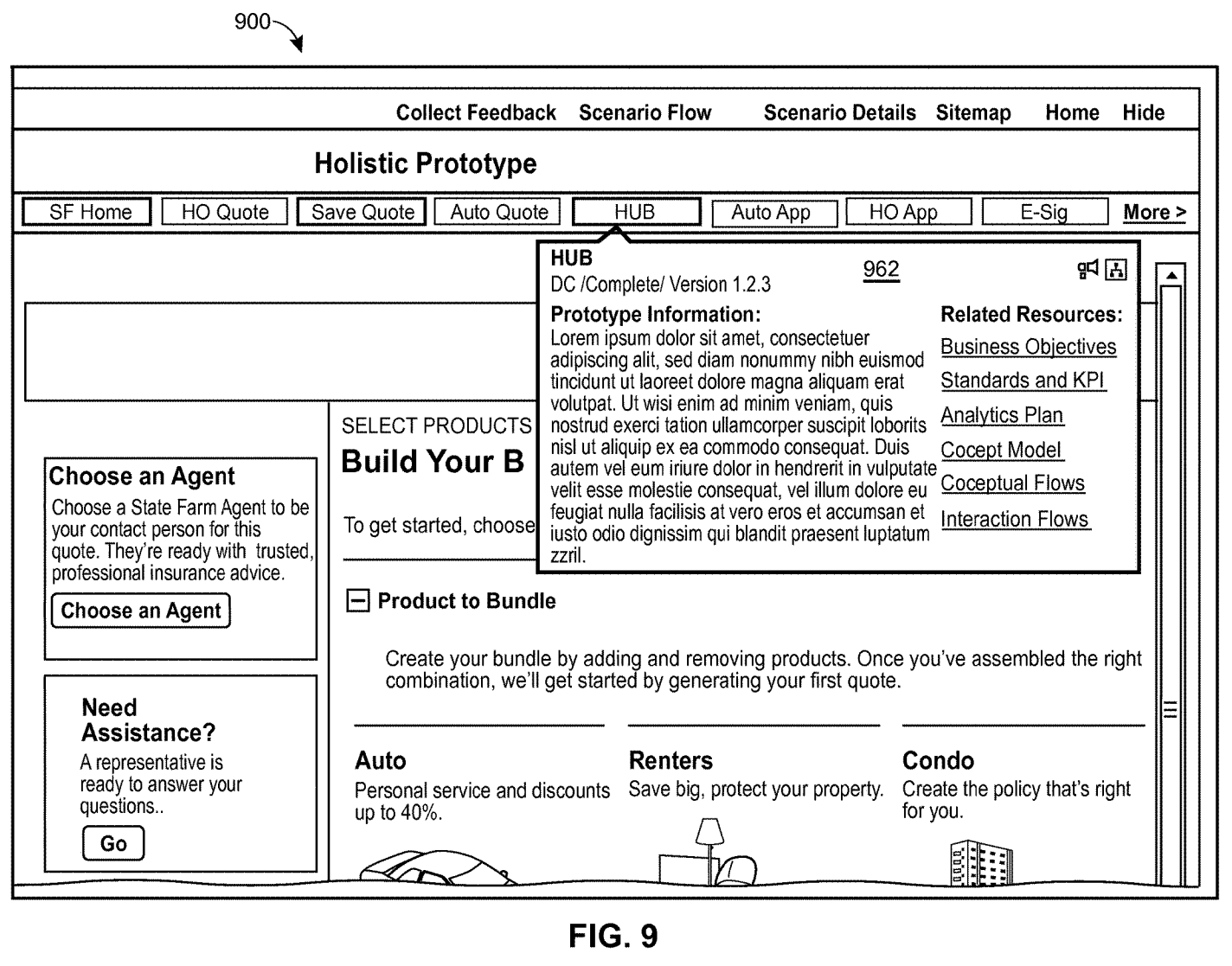

FIG. 9 depicts another example interface 900 in the context of the test scenario view. As shown in FIG. 9, a user has selected the "HUB" selection which causes the example interface 900 to display a HUB window 962. According to embodiments, the HUB window 962 includes descriptions of the test scenario or any of its project-level prototypes, as well as links to one or more related resources.

Figure 10:
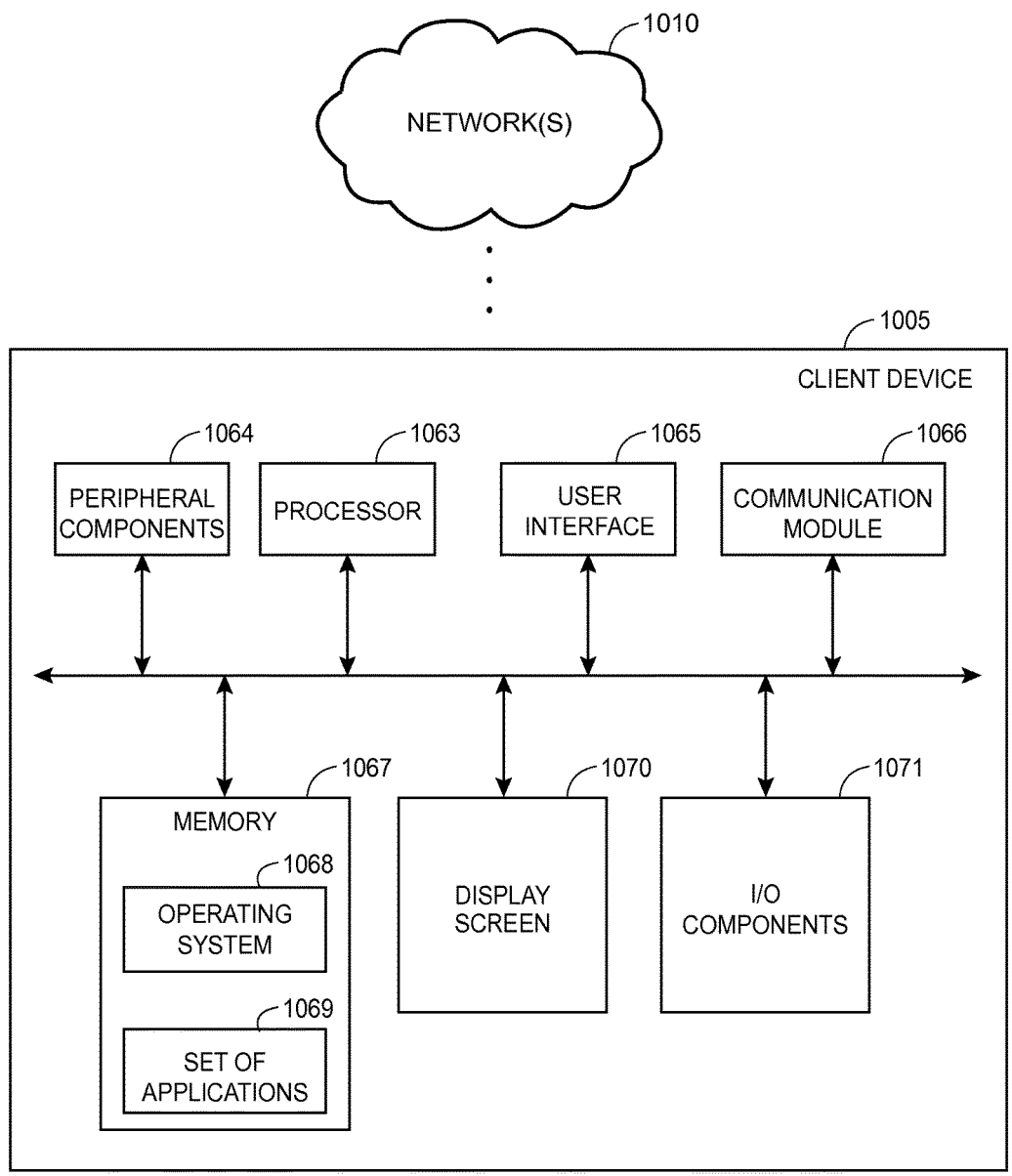
FIG. 10 is a block diagram of a computing device in accordance with some embodiments.

FIG. 10 illustrates an example client device 1005 in which the functionalities as discussed herein may be implemented. The client device 1005 can include a processor 1063 as well as a memory 1067. The memory 1067 can store an operating system 1068 capable of facilitating the functionalities as discussed herein as well as a set of applications 1069. For example, one of the set of applications 1069 can initiate and facilitate the testing environment interfaces as discussed herein. The processor 1063 can interface with the memory 1067 to execute the operating system 1068 and the set of applications 1069. According to embodiments, the memory 1067 can store data associated with the testing environments, the test scenarios, any project-level prototypes associated therewith, and/or any other data. It should be appreciated that the client device 1005 can interface with a remote entity (such as the web server 115 as discussed with respect to FIG. 1) to retrieve the testing environment data. The memory 1067 can include one or more forms of volatile and/or non-volatile, fixed and/or removable memory, such as read-only memory (ROM), electronic programmable read-only memory (EPROM), random access memory (RAM), erasable electronic programmable read-only memory (EEPROM), and/or other hard drives, flash memory, MicroSD cards, and others.

The client device 1005 can further include a communication module 1066 configured to communicate data via one or more networks 1010. According to some embodiments, the communication module 1066 can include one or more transceivers (e.g., WWAN, WLAN, and/or WPAN transceivers) functioning in accordance with IEEE standards, 3GPP standards, or other standards, and configured to receive and transmit data via one or more external ports. For example, the transceiver can receive test scenario data from a web server via the network 1010. The electronic device 1005 may further include a user interface 1065 to present information to the user and/or receive inputs from the user. As shown in FIG. 10, the user interface 1065 includes a display screen 1070 and I/O components 1071 (e.g., ports, capacitive or resistive touch sensitive input panels, keys, buttons, lights, LEDs, speakers, microphones, and others).

In general, a computer program product in accordance with an embodiment includes a non-transitory computer usable storage medium (e.g., standard random access memory (RAM), an optical disc, a universal serial bus (USB) drive, or the like) having computer-readable program code embodied therein, wherein the computer-readable program code is adapted to be executed by the processor 1063 (e.g., working in connection with the operating system 1879) to facilitate the functions as described herein. In this regard, the program code may be implemented in any desired language, and may be implemented as machine code, assembly code, byte code, interpretable source code or the like (e.g., via C, C++, Java, Actionscript, Objective-C, Javascript, CSS, XML, and/or others).

Figure 11:
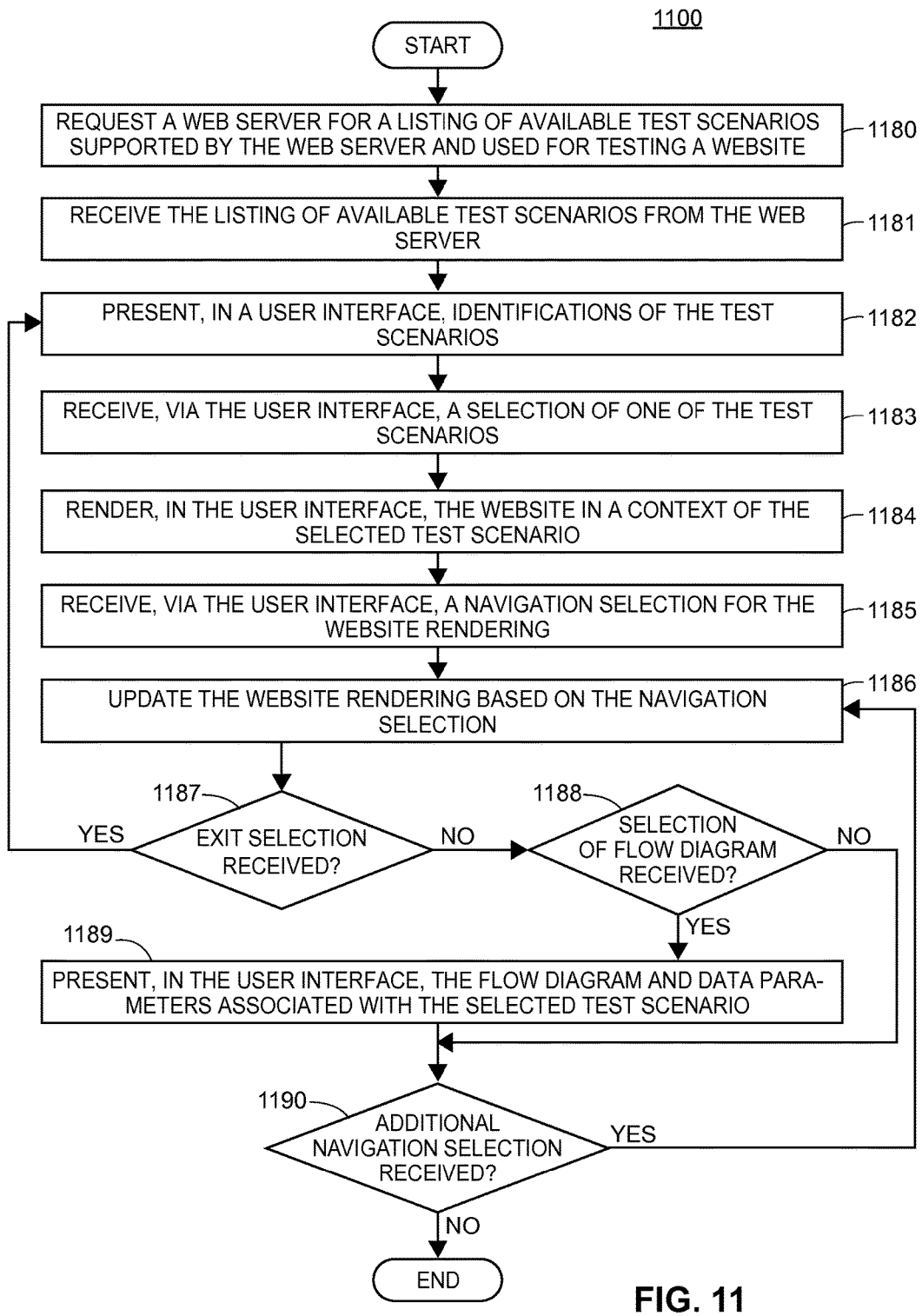
FIG. 11 depicts a flow diagram of supporting a testing environment in accordance with some embodiments.

FIG. 11 is an example method 1100 for supporting a testing environment associated with a web server configured to host a website. At least a portion of the method 1100 may be performed by one or more computing devices, in an embodiment. For example, the method 1100 may be performed by a client device such as the client device 105 as described with respect to FIG. 1.

The computing device can request 1180 the web server for a listing of available test scenarios supported by the web server and used for testing the website. According to embodiments, the available test scenarios can each be associated with purchasing one or more insurance products. The computing device can receive 1181 the listing of available test scenarios from the web server. According to embodiments, the test scenarios can be assembled automatically or manually by one or more users using project-level prototypes as discussed herein. The computing device can present 1182, in a user interface, identifications of the test scenarios. In some cases, the identifications can include selectable links for each of the test scenarios.

The computing device can receive 1183, via the user interface, a selection of one of the test scenarios. For example, a user may want to test the ability to purchase a bundle of multiple insurance products. The computing device can render 1184, in the user interface, the website in a context of the selected test scenario. For example, the computing device can render one or more user interfaces associated with purchasing the one or more insurance products corresponding to the selected test scenario, as well as any selectable options for gauging correct operation of the website (as discussed with respect to FIGS. 3-9).

The computing device can receive 1185, via the user interface, a navigation selection for the website rendering. In some embodiments, the navigation selection can be identification data associated with the user (e.g., a ZIP code, a phone number, an address, a city, etc.), a selection of an insurance product, a selection to proceed to an interface of the test scenario, or other navigation selections. The computing device can update 1186 the website rendering based on the navigation selection. For example, the computing device can navigate to an additional interface, display an additional insurance product for selection, identify and indicate one or more insurance agents associated with identification data, and/or perform other updates.

The computing device can determine 1187 if an exit selection is received. If the exit selection is received ("YES"), processing can proceed to 1182 where the computing device can present the identifications of the test scenarios in the user interface, or to other functionality. If the exit selection is not received ("NO"), the computing device can determine 1188 if a selection of a flow diagram is received. If the flow diagram selection is received ("YES"), the computing device can present 1189, in the user interface, the flow diagram and data parameters associated with the selected test scenario. In embodiments, the flow diagram can indicate any past or potential navigation selections, any associated project-level scenarios, any values for data fields, or any other data, as discussed with respect to FIG. 8. If the flow diagram selection is not received ("NO"), processing can proceed to 1190 where the computing device can determine if an additional navigation selection is received, or to other functionality. If an additional navigation selection is received ("YES"), processing can return to 1186 where the computing device can update the website rendering based on the additional navigation selection, or to other functionality. If an additional navigation selection is not received ("NO"), processing can end, repeat, or return to any previous functionality.

Although the foregoing text sets forth a detailed description of numerous different embodiments, it should be understood that the scope of the patent is defined by the words of the claims set forth at the end of this patent. The detailed description is to be construed as exemplary only and does not describe every possible embodiment because describing every possible embodiment would be impractical, if not impossible. Numerous alternative embodiments could be implemented, using either current technology or technology developed after the filing date of this patent, which would still fall within the scope of the claims.

Thus, many modifications and variations may be made in the techniques and structures described and illustrated herein without departing from the spirit and scope of the present claims. Accordingly, it should be understood that the methods and systems described herein are illustrative only and are not limiting upon the scope of the claims.

I claim:

1. A computer implemented method of supporting a testing environment associated with a website for purchasing insurance products, the method comprising:
presenting, in a user interface, identifications of a plurality of test scenarios for testing the website;
receiving, by a user via the user interface, a selection of one of the plurality of test scenarios, the selected test scenario associated with a purchase of at least one of the insurance products;
rendering, in the user interface by a processor, the website in a context of the selected test scenario;
receiving, via the user interface, identification data associated with the user;
identifying at least one insurance agent associated with the at least one insurance product based on the identification data; and
updating the website rendering to indicate the at least one insurance agent.

2. The method of claim 1, further comprising:
receiving, via the user interface, at least one navigation selection for the selected test scenario; and
updating the website rendering based on the at least one navigation selection, wherein the website rendering is updated with a progress indicator associated with the purchase of the at least one insurance product.

3. The method of claim 2, wherein the at least one insurance product includes a first insurance product and a second insurance product, and wherein updating the website rendering comprises:
presenting a first insurance product selector that enables a user to select the first insurance product, wherein the at least one navigation selection corresponds to the user selecting the first insurance product; and
responsive to receiving the at least one navigation selection, presenting a second insurance product selector that enables the user to select the second insurance product.

4. The method of claim 1, further comprising:
detecting an exit selection to exit the selected test scenario; and
responsive to detecting the exit selection, presenting the identifications of the plurality of test scenarios in the user interface.

5. The method of claim 4, further comprising:
receiving, via the user interface, an additional selection of an additional one of the plurality of test scenarios, the selected additional test scenario associated with a purchase of an additional at least one of the insurance products; and
additionally rendering, in the user interface by the processor, the website in a context of the selected additional test scenario.

6. The method of claim 1, further comprising:
receiving, via the user interface, a selection of a flow diagram indicated in the website rendering; and
presenting, in the user interface, the flow diagram and data parameters associated with the selected test scenario.

7. The method of claim 6, wherein the data parameters include at least one of one or more project-level prototypes or values for data fields associated with the selected test scenario.

8. A system for supporting a testing environment associated with a website for purchasing insurance products, comprising:
a user interface adapted to receive user input from a user;
a display device adapted to display content and implement the user interface;
a memory adapted to store data related to a plurality of test scenarios for testing the website; and
a processor adapted to interface with the user interface, the display device, and the memory, wherein the processor is configured to execute computer executable instructions stored in the memory to cause the processor to:
cause the display device to present identifications of the plurality of test scenarios,
receive, via the user interface, a selection of one of the plurality of test scenarios, the selected test scenario associated with a purchase of at least one of the insurance products,
cause the display device to render the website in a context of the selected test scenario,
receive, via the user interface, identification data associated with the user,
identify at least one insurance agent associated with the at least one insurance product based on the identification data, and
cause the display device to update the website rendering to indicate the at least one insurance agent.

9. The system of claim 8, wherein the processor is configured to execute the computer executable instructions to further cause the processor to:
receive, via the user interface, at least one navigation selection for the selected test scenario, and
cause the display device to update the website rendering based on the at least one navigation selection, wherein the website rendering is updated with a progress indicator associated with the purchase of the at least one insurance product.

10. The system of claim 9, wherein the at least one insurance product includes a first insurance product and a second insurance product, and wherein the processor causes the display device to update the website rendering by:
causing the display device to present a first insurance product selector that enables a user to select the first insurance product, wherein the at least one navigation selection corresponds to the user selecting the first insurance product, and
responsive to receiving the at least one navigation selection, causing the display device to present a second insurance product selector that enables the user to select the second insurance product.

11. The system of claim 8, wherein the processor is configured to execute the computer executable instructions to further cause the processor to:
detect an exit selection to exit the selected test scenario, and
responsive to detecting the exit selection, cause the display device to present the identifications of the plurality of test scenarios.

12. The system of claim 11, wherein the processor is configured to execute the computer executable instructions to further cause the processor to:
receive, via the user interface, an additional selection of an additional one of the plurality of test scenarios, the selected additional test scenario associated with a purchase of an additional at least one of the insurance products, and
cause the display device to additionally render the website in a context of the selected additional test scenario.

13. The system of claim 8, wherein the processor is configured to execute the computer executable instructions to further cause the processor to:
    receive, via the user interface, a selection of a flow diagram indicated in the website rendering, and
    cause the display device to present the flow diagram and data parameters associated with the selected test scenario.

14. The system of claim 13, wherein the data parameters include at least one of one or more project-level prototypes or values for data fields associated with the selected test scenario.

15. A computer readable storage medium comprising non-transitory computer readable instructions stored thereon for supporting a testing environment associated with a website for purchasing insurance products, the instructions when executed on a processor cause the processor to:
    present, in a user interface, identifications of a plurality of test scenarios for testing the website;
    receive, by a user via the user interface, a selection of one of the plurality of test scenarios, the selected test scenario associated with a purchase of at least one of the insurance products;
    render, in the user interface, the website in a context of the selected test scenario;
    receive, via the user interface, identification data associated with the user;
    identify at least one insurance agent associated with the at least one insurance product based on the identification data; and
    update the website rendering to indicate the at least one insurance agent.

16. The computer readable storage medium of claim 15, wherein the instructions when executed on the processor further cause the processor to:
    receive, via the user interface, at least one navigation selection for the selected test scenario; and
    update the website rendering based on the at least one navigation selection, wherein the website rendering is updated with a progress indicator associated with the purchase of the at least one insurance product.

17. The computer readable storage medium of claim 16, wherein the at least one insurance product includes a first insurance product and a second insurance product, and wherein the processor updates the website rendering by:
    presenting a first insurance product selector that enables a user to select the first insurance product, wherein the at least one navigation selection corresponds to the user selecting the first insurance product; and
    responsive to receiving the at least one navigation selection, presenting a second insurance product selector that enables the user to select the second insurance product.

18. The computer readable storage medium of claim 15, wherein the instructions when executed on the processor further cause the processor to:
    detect an exit selection to exit the selected test scenario; and
    responsive to detecting the exit selection, present the identifications of the plurality of test scenarios in the user interface.

19. The computer readable storage medium of claim 18, wherein the instructions when executed on the processor further cause the processor to:
    receive, via the user interface, an additional selection of an additional one of the plurality of test scenarios, the selected additional test scenario associated with a purchase of an additional at least one of the insurance products; and
    additionally render, in the user interface by the processor, the website in a context of the selected additional test scenario.

20. The computer readable storage medium of claim 15, wherein the instructions when executed on the processor further cause the processor to:
    receive, via the user interface, a selection of a flow diagram indicated in the website rendering; and
    present, in the user interface, the flow diagram and data parameters associated with the selected test scenario.

\* \* \* \* \*